(No Model.) 3 Sheets—Sheet 1.

A. ANDERSON.
BROOM CORN COMBING MACHINE.

No. 413,883. Patented Oct. 29, 1889.

WITNESSES:
Fred. G. Dieterich
H. M. Richards

INVENTOR.
A. Anderson
By W. B. Richards
ATTORNEY

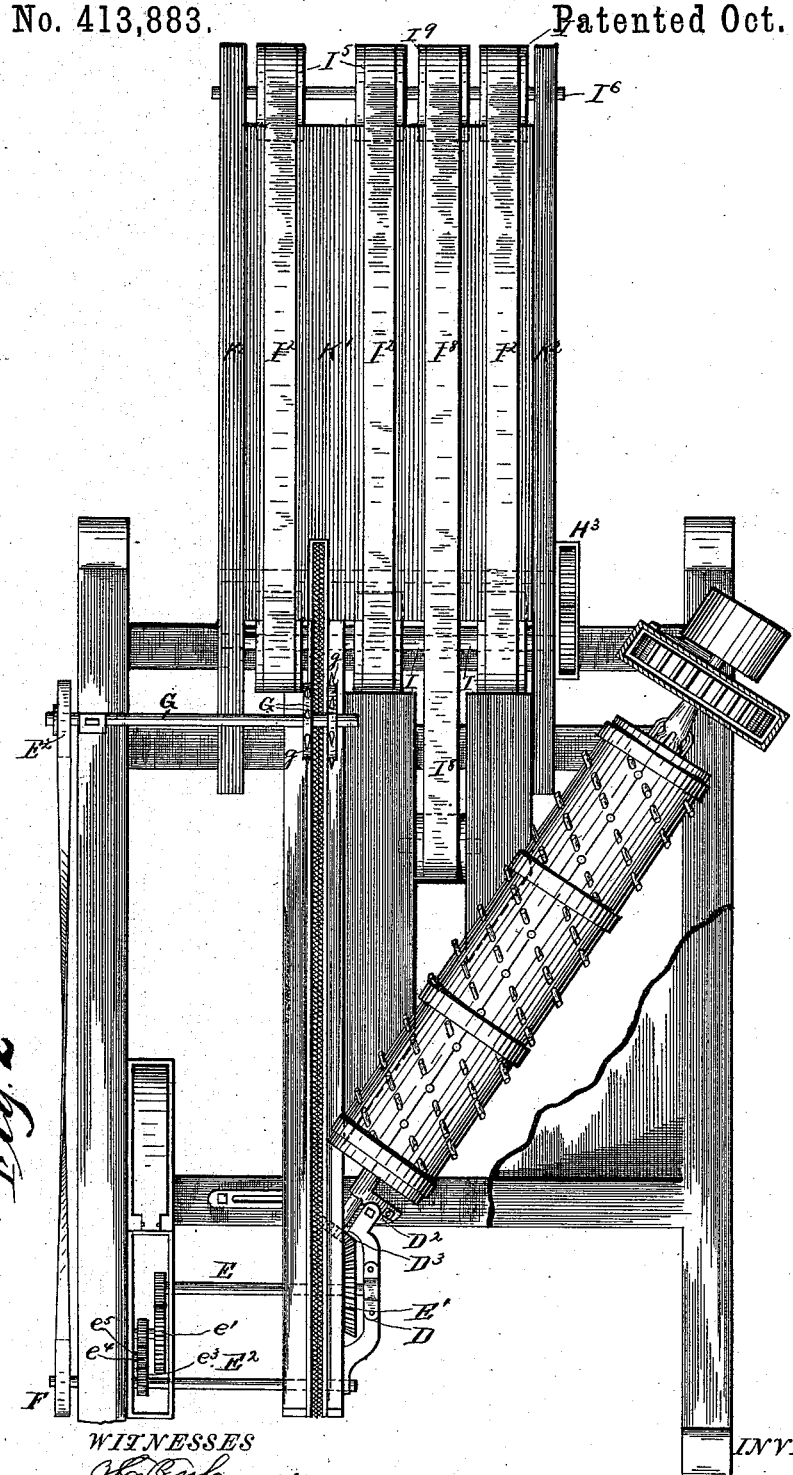

(No Model.) 3 Sheets—Sheet 3.

A. ANDERSON.
BROOM CORN COMBING MACHINE.

No. 413,883. Patented Oct. 29, 1889.

WITNESSES:
Fred. G. Dieterich
H. M. Richards

INVENTOR.
A. Anderson,
By W. B. Richards
ATTORNEY

UNITED STATES PATENT OFFICE.

ABRAHAM ANDERSON, OF GALESBURG, ILLINOIS, ASSIGNOR TO G. D. COLTON & COMPANY, OF SAME PLACE.

BROOM-CORN-COMBING MACHINE.

SPECIFICATION forming part of Letters Patent No. 413,883, dated October 29, 1889.

Application filed September 28, 1885. Serial No. 178,410. (No model.)

*To all whom it may concern:*

Be it known that I, ABRAHAM ANDERSON, a citizen of the United States, residing at Galesburg, in the county of Knox and State of Illinois, have invented certain new and useful Improvements in Broom-Corn-Combing Machines, of which the following is a specification.

My invention relates to broom-corn-combing machines wherein a series of aprons and a toothed feed-belt convey the broom-corn brush to a pair of combing-cylinders arranged obliquely across the path of the broom-corn brush, and which will, as said brush advances, comb out the seed and light stuff from the tops thereof, and prepare it for marketable stock to be used for making brooms.

My invention consists in constructions and combinations hereinafter described and claimed, and shown embodied in a machine in the accompanying drawings, in which—

Figure 1:
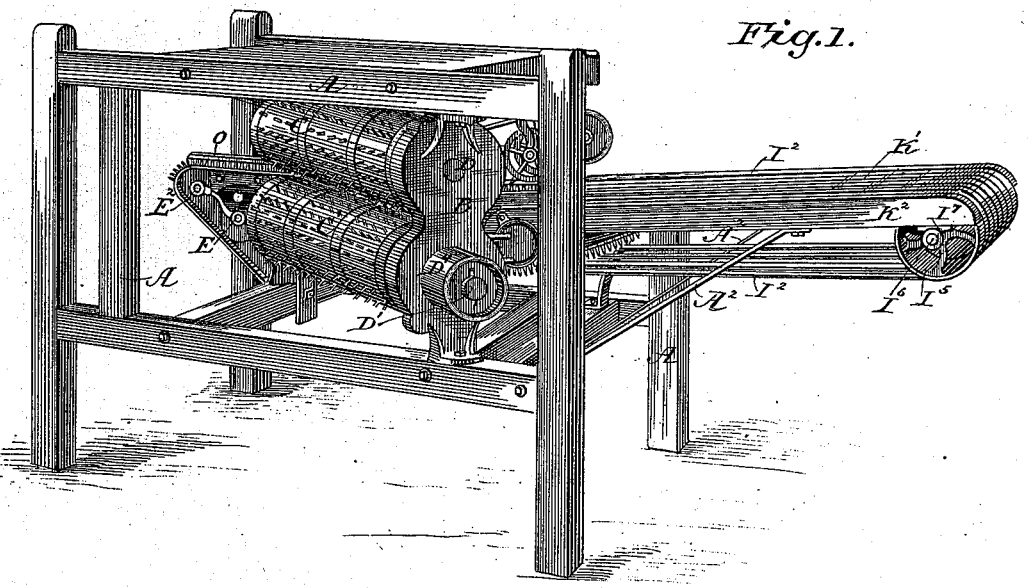
Figure 3:
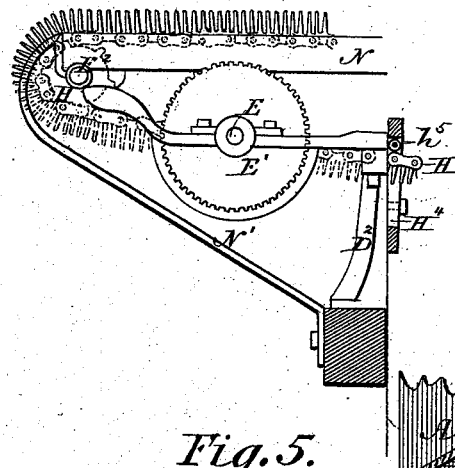
Figure 7:
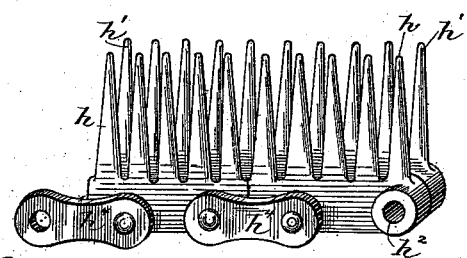
Figure 5:
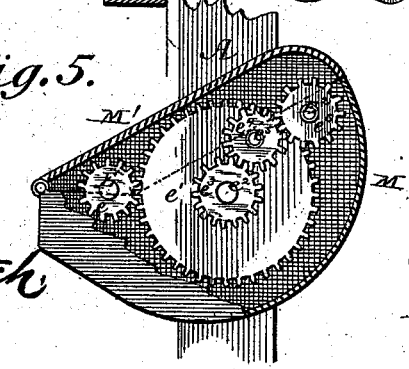
Figure 4:
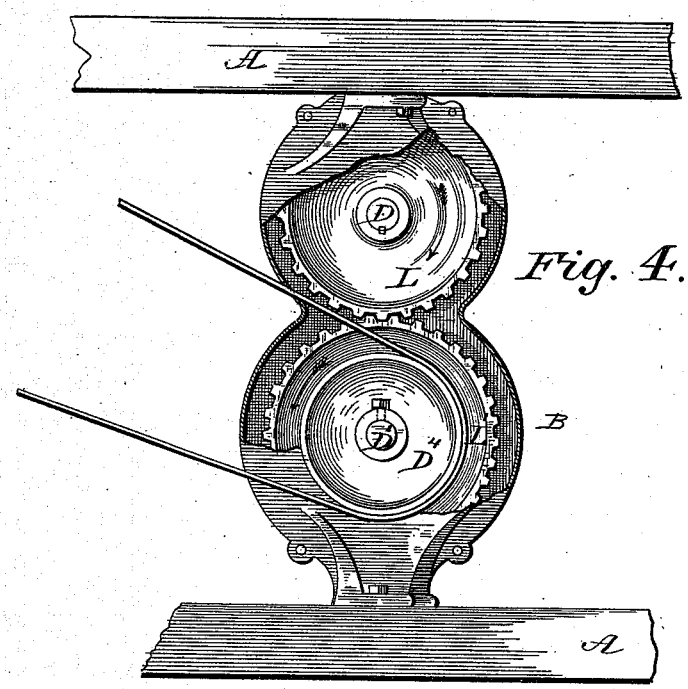
Figure 6:
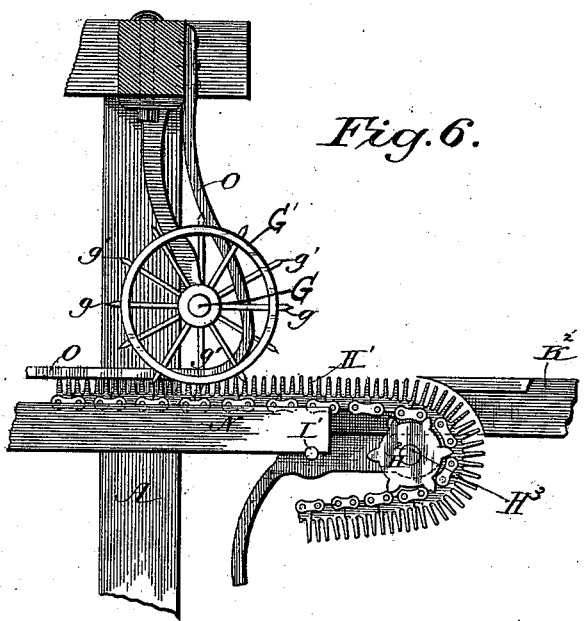

Figure 1 is a perspective of a broom-corn-combing machine constructed according to my invention; Fig. 2, a plan of the same upon an enlarged scale, with the housing and gear-covers partly removed; Fig. 3, a detail in elevation of the discharge end of the toothed feed-belt and adjacent parts; Fig. 4, a detail, an elevation of the gearing by means of which the lower combing-cylinder operates the upper cylinder, and of the housing partly broken away; Fig. 5, a detail, with parts broken away, to the pinions and gears for transmitting motion from shaft E to shaft $E^2$; Fig. 6, an enlarged detail, an elevation of the receiving end of the toothed feed-belt, of a toothed feed-wheel, the end of the bar O, and other parts; and Fig. 7, a perspective showing a part of the toothed feed-belt.

A frame A of suitable construction supports the housing B, which incloses the gear-wheels of a pair of combing-cylinders C C', secured upon shafts D D', arranged obliquely across the frame, the opposite ends of said shafts being supported upon journal-bearings $D^2$, secured to the rear ends of the frame-timbers. A bevel-pinion $D^3$, carried on the rear end of the lower shaft D', engages a bevel gear-wheel E', secured to the end of a shaft E, supported in bearings and arranged at the rear end of the frame beneath the bed or track over which the broom-corn is passed and from which it is finally delivered. A counter-shaft $E^2$, arranged parallel to the shaft E and connected therewith by a train of gear-wheels and pinions $e$, $e'$, $e^3$, $e^4$, and $e^6$, is provided with a band-pulley F, which is connected by a crossed belt F' with and serves to drive a feed-wheel shaft G, arranged at the forward end of the frame, as will hereinafter appear. A sprocket-wheel H is also secured to the shaft $E^2$ and serves to carry and drive a toothed feed-belt H', which receives the broom-corn delivered to it by feed-wheels G', secured to the shaft G, and carries the broom-corn forward to be acted upon by the combing-cylinders.

The forward end of the toothed feed-belt H' is supported upon a sprocket-wheel $H^2$, secured to a shaft $H^3$, to drive the same. A series of pulleys I are secured to a shaft I', having a gear-wheel $I^4$, meshing with the gear-wheel $I^3$ on shaft $H^3$, which drives by means of said wheels $I^3$ and $I^4$ the shaft I' and pulleys I. These pulleys carry the delivery end of a series of belts $I^2$, which support the stalks and carry them forward over the surface of a feed-board or table-extension K', upon which they are evenly arranged and delivered to the feed-wheels G' and the toothed feed-belt H', by which they are gripped and carried forward between the combing-cylinders with a regular progressive movement.

The forward ends of the belts $I^2$ are carried upon the pulleys $I^5$ of a shaft $I^6$, supported in bearings $I^7$, secured upon the under side of the forward ends of the side bars $K^2$ of the feed-extension K', which is secured to and is supported directly upon the main frame A at its delivery end and is supported upon struts $A^2$, which project obliquely upward and forward from the main frame. A supplemental belt $I^8$ is supported at its forward end upon a pulley $I^9$, secured to the shaft $I^6$, and is supported at its delivery end upon an idler-pulley $I^{10}$, secured to a shaft journaled in bearings upon the main frame beneath the main feed-table K', to carry the belt $I^8$ forward to a point about midway of the length of the combing-cylinders, and thus provide means for supporting the brush end of the corn and carry it forward, while being acted upon by the combing-cylinders, at the same time that the stalks or butt-ends are gripped and carried forward by the toothed feed-belt.

The forward end of the shaft D' carries a band-pulley D$^4$, by which motion is imparted to the machine. A pair of engaging spur-wheels L L', of unequal diameters, are keyed to the shafts D D' to drive them in opposite directions, as indicated by the arrows in Fig. 4. The smaller wheel L is secured to the upper cylinder C, which is thereby driven faster than the lower cylinder, by which means the broom-corn is whipped more thoroughly, and its natural tendency to lie upon the lower cylinder and fall away from the upper cylinder is greatly counteracted by the increased speed imparted to the upper cylinder. The gearing L L' is inclosed by the housing B, which serves to completely protect them from being choked up by stalks and fragments broken from the broom-corn brush.

The rear ends of the shafts D D' are supported in journal-bearings D$^2$, secured to the rear ends of the frame-timbers, and the said bearings D$^2$ are bolted firmly to similar bearings D$^4$, also secured to the rear ends of the frame-timbers, which serve to support the corresponding ends of the parallel shafts E E$^2$, above described. The opposite ends of said shafts E E$^2$ are supported in bearings in a cast-iron boxing M, which provides not only a bearing for the ends of the shafting, but completely incloses a train of gear-wheels, which communicate motion from one shaft to the other and retard the speed of the driven shaft to admit of a rapid revolution of the combing-cylinders and a slower movement of the toothed feed-belt and feed-wheels. The boxing M is provided with a hinged cover M', which can be lifted to obtain access to the gear-wheel journals to oil and clean them. The gearing for connecting the shafts E E$^2$ consists of a pinion $e$ on the shaft E, a spur-gear $e'$ on a shaft $e^2$, journaled in the boxing M, a pinion $e^3$ on the shaft $e^2$, an idler-pinion $e^4$ on a stud-axle $e^5$, projecting from the boxing M, and a gear-wheel $e^6$ on the shaft E$^2$, on the ends of which shaft are secured the band-pulley F and sprocket-wheel H. The toothed feed-belt H is formed of a double row of toothed sections $h\ h'$, provided with corresponding pivot-pin holes $h^2$, and joined by links $h^4$ outside of the sections $h\ h'$. The links $h^4$ are of sufficient thickness to provide a firm bearing for the belt upon the rims of the sprocket-wheels H H$^2$, and the belt is supported against lateral movement by guide-rails N N, secured to the frame of the machine upon opposite sides of the toothed feed-belt. A doffer-bar N' forms a continuation of the inner rail N, and is bowed around the delivery ends of the belt H' eccentrically to the sprocket-wheel H, and then extends downwardly and forwardly, and is bolted to the frame, as shown at Fig. 3. The eccentric arrangement of the upper end of the doffer-bar N' around the delivery end of the belt H' provides an abutment over which the broom-corn brush held between the teeth of the belt passes, and serves to disengage it from the belt and effect its discharge therefrom at the delivery end of the machine. Guide-plates H$^4$, adjustably secured to the frame of the machine, are provided with friction-rollers $h^5$, beneath which the belt H' passes, and serves to take up the slack of the belt and hold it to its course. The feed-wheels G' are each provided with teeth $g\ g'$, which project from the rims of the wheels and revolve alongside of the teeth of the belt H' to compress and pack the broom-corn evenly and securely between the teeth of the belt. The teeth of each wheel are arranged or spaced around their respective wheels intermediately with the teeth of the opposite wheel, and the broom-corn is prevented from being drawn obliquely across the table by the action of the combing-cylinders. As the brush ends of the broom-corn are drawn forward by the rapidly-revolving cylinders the stalks are caught by the teeth $g'$ and drawn forward to deposit them between the teeth of the belt H' transversely thereto.

A bar O is suspended from the frame A, and is arranged horizontally above the table to bear alongside of the upper ends of the inner row of teeth upon the belt H', and serves to hold the broom-corn securely between the teeth nearly throughout the entire forward movement of the belt.

In operation the broom-corn is laid in proper order upon the conveyer-aprons and feed-table extension, and is pressed downward and fed by the toothed feed-wheels to the feed-belt, with which they are held in contact all the way through by the downward pressure on them of the bar O. The rapid revolution of the combing-cylinders tends to draw the brush ends of the corn in advance of its stalk ends and to feed the corn forward faster than it would be combed of its seed. This rapid movement is resisted by the feed-belt and the corn held back thereby in such manner that the seed will be thoroughly whipped and combed from the corn, while the corn will at the same time be fed regularly forward and through the machine, and held at all times at right angles to the feed-belt, so that the combing-cylinders will commence acting on each stalk of corn at its tip end.

I claim as my invention and desire to secure by Letters Patent—

1. In a broom-corn comber, a spiked belt for conveying the straw, in combination with a toothed wheel revolving at the side of said belt and in the same direction, and a fixed guide for holding the brush in place.

2. In a broom-corn comber, revolving pulleys, horizontal feed-belts running upon the same, and a spiked belt for conveying the straw running between said belts, in combination with a toothed wheel revolving at the side of said belt and in the same direction, and a fixed guide for holding the brush in place.

3. In a broom-corn-combing machine, the combination of the combing-cylinders arranged obliquely to the line of feed, a spiked belt for conveying the straw, a toothed wheel revolving at the side of said belt, and a fixed guide for holding the brush in place.

4. In a broom-corn-combing machine, the combination of the combing-cylinders arranged obliquely to the feed, a spiked belt for conveying the straw, a toothed wheel revolving at the side of the belt, a fixed guide for holding the brush in place, and the feed-belt $I^8$.

5. In a broom-corn-combing machine, the combination of the combing-cylinders, the spiked belt for conveying the straw, a toothed wheel revolving at the side of the belt, a fixed guide for holding the brush in place, and the doffer-bars $N'$, curved around the feed-belt to disengage the brush from the latter.

In testimony whereof I affix my signature in presence of two witnesses.

ABRAHAM ANDERSON.

Witnesses:
F. M. ANAWALT,
ALBERT NEWMANN.